United States Patent [19]

Shibatani et al.

[11] Patent Number: 5,459,592
[45] Date of Patent: Oct. 17, 1995

[54] PROJECTION DISPLAY SYSTEM INCLUDING A COLLIMATING TAPERED WAVEGUIDE OR LENS WITH THE NORMAL TO OPTICAL AXIS ANGLE INCREASING TOWARD THE LENS CENTER

[75] Inventors: Takashi Shibatani, Tenri; Tokihiko Shinomiya, Nara; Takuji Yamatani, Tenri; Hiroshi Hamada, Nara; Hiroshi Nakanishi, Tenri, all of Japan

[73] Assignee: Sharp Kabushiki Kaisha, Osaka, Japan

[21] Appl. No.: 50,909

[22] Filed: Apr. 21, 1993

[30]  Foreign Application Priority Data

Apr. 24, 1992 [JP] Japan .................. 4-106793
Jun. 15, 1992 [JP] Japan .................. 4-155415
Jun. 22, 1992 [JP] Japan .................. 4-163026

[51] Int. Cl.$^6$ ............................... G02F 1/1335
[52] U.S. Cl. .................. 359/40; 359/42; 359/49
[58] Field of Search ................. 359/40, 41, 42, 359/49

[56]  References Cited

U.S. PATENT DOCUMENTS

| Re. 28,891 | 7/1976 | Borel et al. | 359/59 |
|---|---|---|---|
| 4,422,731 | 12/1983 | Droguet et al. | 359/80 |
| 4,432,610 | 2/1984 | Kobayashi et al. | 359/59 |
| 4,735,495 | 4/1988 | Henkes | 359/42 |
| 4,790,632 | 12/1988 | Miyakawa et al. | 359/40 |
| 4,824,216 | 4/1989 | Perbet et al. | 359/40 |
| 4,936,657 | 6/1990 | Tejima et al. | 359/40 |
| 4,950,059 | 8/1990 | Roberts | 359/48 |
| 5,056,895 | 10/1991 | Kahn | 359/71 |
| 5,083,854 | 1/1992 | Zampolin et al. | 359/40 |
| 5,150,238 | 9/1992 | Nakanishi et al. | 359/49 |
| 5,189,500 | 2/1993 | Kusunoki | 359/48 |
| 5,206,749 | 4/1993 | Zavracky et al. | 359/59 |
| 5,251,049 | 10/1993 | Sato et al. | 359/59 |

FOREIGN PATENT DOCUMENTS

| 3123369 | 2/1983 | European Pat. Off. . | |
|---|---|---|---|
| 2553552 | 4/1985 | European Pat. Off. . | |
| 0228288 | 7/1987 | European Pat. Off. . | |
| 0295913 | 12/1988 | European Pat. Off. | 359/40 |
| 0339991 | 11/1989 | European Pat. Off. . | |
| 0425251 | 5/1991 | European Pat. Off. | 359/40 |
| 57-74713 | 5/1982 | Japan . | |
| 58-86613 | 6/1983 | Japan . | |
| 60-165624 | 8/1985 | Japan . | |

(List continued on next page.)

OTHER PUBLICATIONS

Oikawa et al, "Distributed–index planar microlens array prepared from deep electromigration", Electronics Letters, vol. 17, No. 13 (Jun. 1981), pp. 452–454.

E. L. Kerr, "Compact Sunshade For Telescope Antenna", Applied Optics, vol. 29, No. 24, p. 3458 (Aug. 29, 1990).

Patent Abstracts of Japan, vol. 13, No. 127 (p.–848), Mar. 1989.

Patent Abstracts of Japan, vol. 6, No. 156 (P.–135), Aug. 1982).

Patent Abstracts of Japan, vol. 12, No. 366 (p.–765), Sep. 1988.

*Primary Examiner*—Anita Pellman Gross
*Attorney, Agent, or Firm*—David G. Conlin; Kevin J. Fournier

[57]  ABSTRACT

The present invention provides a lighting device including a light source; a reflecting mirror for reflecting light emitted by the light source in a determined direction; and a compensating element for receiving the light from the reflecting mirror and allowing the light to outgo in the form of parallel rays. Further, a projection type image display system including the above-mentioned lighting device and a display element for forming an image by receiving light from the lighting device is provided. According to the present invention, light can be emitted with a satisfactory degree of parallelization and an even illuminance, constant irregularity due to the photoelasticity can be degraded, and the degradation in brightness of a projected image due to a low ratio of aperture can be avoided. Thus, a uniform image with no illuminance irregularity can be projected.

13 Claims, 13 Drawing Sheets

U.S. PATENT DOCUMENTS

| | | |
|---|---|---|
| 60-165621 | 8/1985 | Japan . |
| 60-165623 | 8/1985 | Japan . |
| 60-165622 | 8/1985 | Japan . |
| 60-262131 | 12/1985 | Japan . |
| 61-11788 | 1/1986 | Japan . |
| 63-118125 | 5/1988 | Japan . |
| 63-298217 | 12/1988 | Japan . |
| WO 90/11545 | 10/1990 | WIPO . |

# PROJECTION DISPLAY SYSTEM INCLUDING A COLLIMATING TAPERED WAVEGUIDE OR LENS WITH THE NORMAL TO OPTICAL AXIS ANGLE INCREASING TOWARD THE LENS CENTER

BACKGROUND OF THE INVENTION

1. Field of the Invention

The present invention relates to a lighting device and a projection type image display system such as a projection television set, an overhead projector and the like. More particularly, it relates to a projection type image display system having microlenses for converging light emitted by the lighting device on respective pixels in a display panel.

2. Description of the Related Art

FIG. 16 shows a structure for a conventional projection type image display system. As is shown in FIG. 16, the projection type image display system has a lighting device comprising a light source 101 for emitting light for illumination and a parabolic mirror 102 for reflecting the light emitted by the light source 101 in a determined direction. A light emitting portion 101a of the light source 101 is positioned at the focal point of the parabolic mirror 102 that is on the optical axis 109. A transmissive type liquid crystal display element 104 as a lighted portion, a condenser lens 105, a projection lens 106 and a screen 107 are provided in this order from the side of the light source 101 so that the central axis of each of these components corresponds to the optical axis 109.

In the above-mentioned projection type image display system, the light emitted by the light source 101 is reflected by the parabolic mirror 102 and changed into the shape of parallel rays to enter the liquid crystal display element 104. An image is formed by the liquid crystal display element 104, and then, the formed image is projected on the screen 107 through the condenser lens 105 and the projection lens 106.

In the transmissive type liquid crystal display element 104 used in the above-mentioned projection type image display system, cross talk is prevented by providing a non-linear element such as a varister and an MIM (metal-insulator-metal) to each pixel in the display panel. Alternatively, each pixel is independently driven by a switching element such as a transistor and the like provided to each pixel. However, when a non-linear element or a switching element is used in the pixel, the pixel has a larger portion which does not contribute to the display, thereby darkening the display and reducing the ratio of aperture. The ratio of aperture herein is defined as a ratio of the total effective area of all the pixels to the area of the display region.

A pixel should be minimized in order to provide a display panel reproducing a desired highly precise image. If the entire components of the pixel were minimized similarly to the pixel, the minimization would not change the ratio of aperture. But a minimization in the width of a metal bus line for electrodes and the size of additional elements such as a non-linear element and a switching element is limited to some extent. This is because accuracy in etching and aligning in the production process is limited. Therefore, as a pixel is minimized, a ratio of the area occupied by a metal bus line for electrodes and additional elements to the entire area of the pixel is increased, thereby decreasing the ratio of aperture.

A low ratio of aperture indicates that more light is blocked by the opaque portion in the pixel which does not contribute to the display. Therefore, a display with a low ratio of aperture looks darker as compared with a display with a higher ratio of aperture even if the same lighting device is used.

In order to prevent the decrease in the ratio of aperture caused by such an attempt for attaining a highly precise image, a microlens array is formed on one surface of the liquid display panel (Japanese Laid-Open Patent Nos. 60-165621 through 60-165624, 60-262131 and 61-11788).

FIG. 17 shows a sectional view of such a liquid crystal display element having a microlens array on a liquid crystal display panel. The liquid crystal display element has a liquid crystal display panel 111 comprising substrates 113 and 114 opposing each other and sandwiching a liquid crystal layer 112 therebetween. A color filter 115 is formed on the inner surface of the substrate 113. A microlens array 116 is provided on the outer surface of the substrate 114 so that each microlens 116a in the microlens array 116 corresponds to each pixel.

In the above described liquid crystal display element, since incident light proceeds along an optical path 121 as is shown in FIG. 18, the light can be converged on an aperture 123 of the pixel satisfactorily by providing the microlens array 116. On the contrary, in the liquid crystal display element without a microlens array 116, incident light proceeds along an optical path 122 to reach other portions than the aperture 123. As a result, a compact and a bright display is attained in the liquid crystal display element having the microlens array 116.

In a commercially available projection type image display system, a light source having a parabolic mirror as is shown in FIG. 16, and a light source as a combination of an elliptical mirror or a spherical mirror and a condenser lens are used in the lighting device. In such a lighting device, light emitted by the light source is reflected by a reflecting mirror such as a parabolic mirror, an elliptical mirror or a spherical mirror in a determined direction.

FIG. 19 is a diagram of a lighting device using a parabolic mirror. In this lighting device, a light source 131 is disposed on the focal point F of a parabolic mirror 132. Light emitted by the light source 131 is reflected by the parabolic mirror 132 and changed into parallel rays shown with solid lines in FIG. 19 and enters a transmissive type display element (not shown).

FIG. 20 is a diagram of a lighting device using an elliptical mirror. In this lighting device, a light source 141 is disposed on the first focal point F1 of an elliptical mirror 142 and a condenser lens (not shown) is disposed on the other side of the light source 141 with respect to the second focal point F2 of the elliptical mirror 142 so that the focal point of the condenser lens corresponds to the second focal point F2 of the elliptical mirror 142. In such a lighting device, light emitted by the light source 141 is reflected by the elliptical mirror 142 to be converged on the second focal point F2, changed into parallel rays and enters the transmissive type display element (not shown).

When a microlens array is used to improve a substantial ratio of aperture as described above, it is required to increase a degree of parallelization of the incident light into the microlens array so as to allow the effect of the microlens array to be exhibited sufficiently. However, in the conventional lighting device, the degree of parallelization is limited due to the arc length of a lamp used as a light source and the accuracy of the reflecting mirror.

When the parabolic mirror as shown in FIG. 19 is used, the light reflected by the parabolic mirror 132 becomes perfect parallel rays as shown with the solid lines if the light source 131 is a complete point source and the parabolic mirror 132 is an idealistic one. However, the arc of the light source 131 actually has a certain size, resulting in producing light as shown with broken lines and dashed lines in FIG. 19. Thus, the degree of parallelization of incident light into the microlens array is decreased. When the arc length is long, an angle $\alpha 1$ formed by the broken line and the solid line and an angle $\alpha 2$ formed by the dashed line and the solid line become large, thereby further degrading the degree of parallelization. In addition, since the accuracy of the parabolic mirror 132 is also limited, the light reflected by the parabolic mirror 132 can not be changed into perfect parallel rays even if the light source 131 is a perfect point source.

This also applies to a case where the elliptical mirror as shown in FIG. 20 is used. If the light source 141 is a perfect point source, the light reflected by the elliptical mirror 142 is accurately converged on the focal point F2. But actually, the light can not be completely converged on the second focal point F2 due to the arc length of the light source 141 and the inaccuracy of the elliptical mirror 142. When the arc length of the light source 141 is long, light shown with broken lines and dashed lines is produced, thereby enlarging the converging spot. Thus, the degree of parallelization of the light having passed through the condenser lens is degraded.

FIG. 21 is a diagram of a case where light with a low degree of parallelization enters a microlens. As is shown in FIG. 21, when light enters a microlens 116a having a focal length f at an angle of $\pm\theta$, a converging spot away from the microlens 116a by the focal length f has a diameter of ($2f\times\tan\theta$). The microlens 116a is provided so as to position its focal point on the aperture of a pixel of a display panel. The converging spot does not completely fall on the aperture of the pixel if the value obtained by ($2f\times\tan\theta$) exceeds the diameter of the aperture of the pixel. This results in insufficient effect attained by the microlens 116a.

There is another problem as follows in such a case: As is shown in FIG. 16, the light source 101 has shading portions 101b such as an electrode and a lead. When the light source 101 is disposed so that the light emitting portion 101a such as the arc corresponds to the optical axis 109, the light shown with two-dot chain lines does not reach the display element 104 due to the shade of the shading portions 101b of the light source 101. This also applies to the lighting devices as shown in FIGS. 19 and 20. As a result, the subjected image has a dark spot in its center. In this case, in the image projected on a projection screen, illuminance is uneven and a uniform image can not be displayed.

In order to avoid this dark spot, the light source can be shifted toward a lighted portion, i.e., the liquid crystal display element 104 in FIG. 16, away from the reflecting mirror. Then, the dark spot can be avoided, but the light illuminating the center of the lighted portion is not parallel to the optical axis, and too much light is converged on the center of the lighted portion, causing too much difference in illuminance between the center and the periphery of the lighted portion. Such a problem is more severe when the lighted portion is nearer to the light source and the reflecting mirror.

Among the projection type image display systems using the lighting device having the above-mentioned disadvantages, especially the projection type liquid crystal image display system is affected by the degree of the parallelization of the light, since the liquid crystal has high viewing angle dependency. Further, the characteristics of the liquid crystal become ununiform by an uneven temperature distribution on a face parallel to the display surface caused by the irregularity of illuminance distribution, thereby making any projected image uneven.

In a projection type liquid crystal display element having a color filter, the temperature of the substrate bearing the color filter is rapidly raised because the color filter absorbs the light. Moreover, since the illuminance distribution of the light is uneven, the temperature rise becomes also uneven, resulting in causing an irregularity in the temperature distribution on the surface of the substrate bearing the color filter. As a result, an anisotropic stress is caused in the substrate by the temperature irregularity, and this anisotropic stress causes an optical anisotropy, so-called photoelasticity. In a liquid crystal display element using polarization, retardation by birefringence is affected and changed by the photoelasticity. Therefore, contrast is partly degraded, thereby producing a bad effect on the display quality.

The color of the color filter fades with time since it is always exposed to a strong light. The extent of the fading depends upon the strength of the light illuminating the color filter. Therefore, when the illuminance distribution is uneven, the fading is also uneven, which can cause color irregularity.

In a projection type image display system using a liquid crystal display element with a microlens array, the defects of the lighting device results in disadvantages. When a light entering a microlens has a low degree of parallelization, the converging efficiency of the microlens is degraded. Therefore, in the center of an image projected by light with a low degree of parallelization, light having passed through the microlens has difficulties in being converged on the aperture of the pixel as compared with in the periphery of the lighted portion. In order to compensate for this, the light is excessively concentrated in the center of the image as described above. As a result, the photoelasticity due to the uneven illuminance distribution is further accelerated, thereby degrading the display quality.

In a display system using the color filter and the microlens array, the above-mentioned defects of each component are accumulated. As a result, the projected image is uneven and color irregularity is caused, thereby largely degrading the display quality.

SUMMARY OF THE INVENTION

The lighting device according to this invention comprises a light source; a reflecting means for reflecting light emitted by the light source in a determined direction; and a compensating means for receiving the light from the reflecting means and allowing the light to outgo in the form of parallel rays.

In one embodiment, the compensating means is a parallel ray selecting means comprising a plurality of optical paths and a light absorbing means formed around each of the optical paths, whereby light reaching the light absorbing means is absorbed to remove unparallel rays.

In one embodiment, the compensating means is a tapered fiber to which the light is directed and one end face of the tapered fiber nearer to the light source is larger than the other end face thereof.

In one embodiment, the compensating means is a compensating lens, whose gradient is adjusted based on Snell's law.

In one embodiment, the compensating lens is a Fresnel lens.

In one embodiment, the compensating means is a compensating lens having a dent point in the central axis of a lens face thereof and the lens face is dented toward the dent point.

In one embodiment, the compensating lens is a Fresnel lens.

In one embodiment, the reflecting means is a reflecting mirror which is a body of rotation having an optical axis as a rotation axis.

Alternatively, the present invention provides a projection type image display system comprising the above-mentioned lighting device and a display element for forming an image by receiving light from the lighting device.

In one embodiment, a compensating lens is further disposed between the parallel ray selecting means and the light source and a gradient of the compensating lens is adjusted based on Snell's law.

In one embodiment, a cross section of the optical path in the parallel ray selecting means has a shape similar to a shape of a pixel contained in the display element.

In one embodiment, the display element is a liquid crystal display element having a microlens array and/or a color filter.

Thus, the invention described herein makes possible the advantages of (1) providing a lighting device which can emit light with a satisfactory degree of parallelization and an even illuminance distribution; (2) providing a projection type image display system for displaying a uniform and bright image in which contrast irregularity due to the photoelasticity can be degraded and in which the degradation in brightness of the image due to a low ratio of aperture can be avoided; and (3) providing a projection type image display system in which a microlens can exhibit its effect sufficiently regardless of the length of the light emitting portion in a light source and in which a uniform image with no illuminance irregularity can be obtained by preventing a dark spot due to the shading from an electrode, etc. of the light source.

These and other advantages of the present invention will become apparent to those skilled in the art upon reading and understanding the following detailed description with reference to the accompanying figures.

DESCRIPTION OF THE PREFERRED EMBODIMENTS

The present invention will now be described by way of examples referring to the appended drawings.

Example 1

Figure 1:
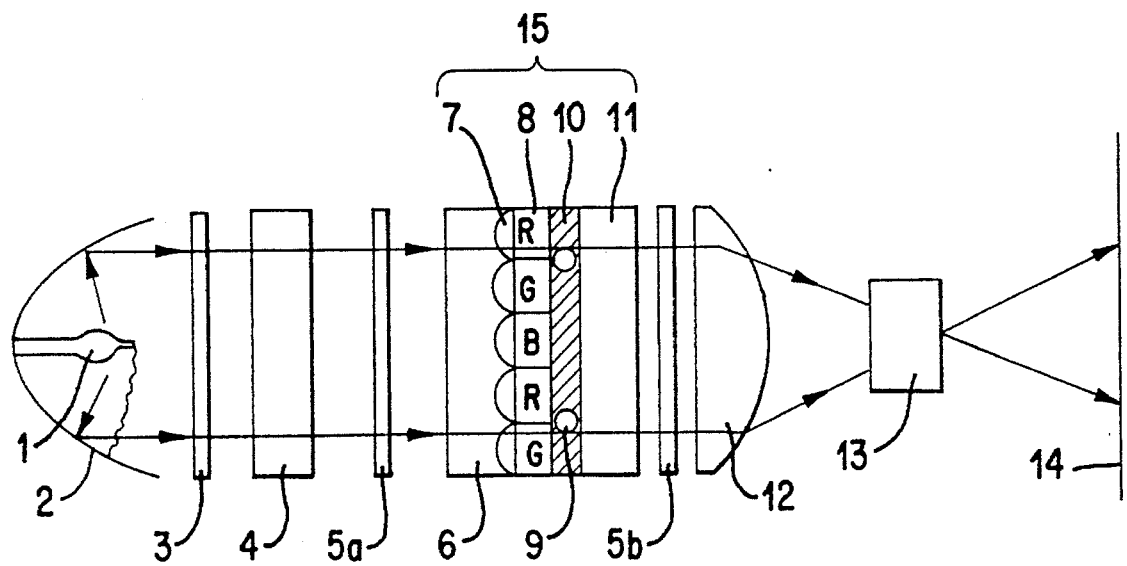
FIG. 1 shows a structure for a projection type image display system according to Example 1 of the present invention.

FIG. 1 shows a structure for a projection type image display system according to this example. The image display system comprises a metal halide lamp as a light source 1 disposed on the focal point of a paraboloid of a parabolic mirror 2. Light emitted by the light source 1 is reflected into an approximately parallel rays by the parabolic mirror 2. The approximately parallel rays then pass through a filter 3 for cutting the infrared and the ultraviolet rays, parallel rays selecting element 4 and a polarizing plate 5a serving as a polarizer in this order to enter a liquid crystal display element 15. An image formed by the light having passed through the liquid crystal display element 15 is projected on a screen 14 through a polarizing plate 5b serving as an analyzer, a lens 12 and a projection lens 13 in this order.

The liquid crystal display element 15 comprises a substrate 6, a microlens array 7, a color filter 8 and a liquid crystal display panel 11 in this order from right to left in FIG. 1, i.e., along the direction of the light path. Each lens in the microlens array 7 and each of red, green and blue filters in the color filter 8 are aligned with each pixel in the liquid crystal display panel 11. The color filter 8 and the liquid crystal display panel 11 are adhered to each other having spacers 9 sandwiched therebetween by an adhesive 10.

Figure 2:
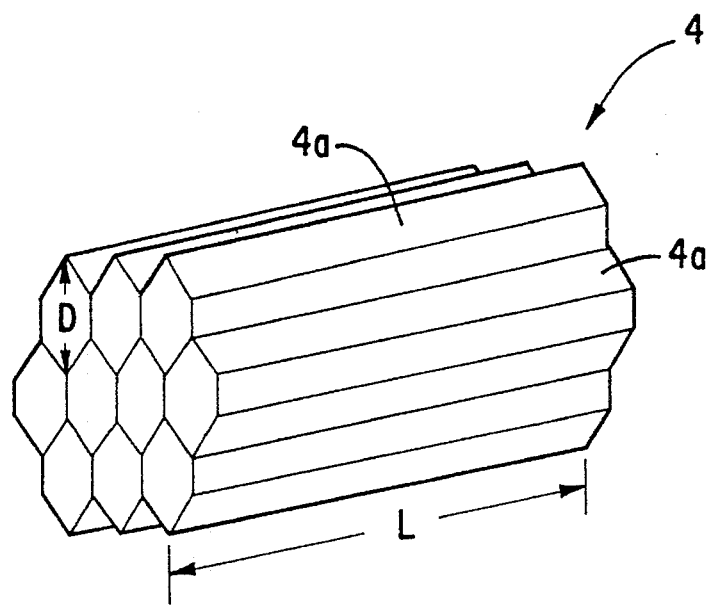
FIG. 2 is a perspective view of parallel rays selecting element.

The parallel ray selecting element 4 comprises, for example, a plurality of optical paths 4a each having the shape of a hexagonal pipe as shown in FIG. 2. A black coating film for light absorption is formed around each of the optical paths 4a. The incident light reaching around the optical path 4a is absorbed by the film, resulting in allowing only approximately parallel rays to outgo from the optical path 4a.

In the projection image display system having the above-mentioned structure, a light with a high degree of parallelization which is useful for the converging effect of the microlens array 7 alone can be selectively used because of the parallel rays selecting element 4 provided between the light source 1 and the polarizing plate 5a. Because of this, the total amount of the light entering the color filter 8 and the polarizing plates 5a and 5b, which are relatively easily heated by light absorption, can be decreased. As a result, the amount of heat in the color filter 8 and the polarizing plates 5a and 5b can be decreased, thereby decreasing display irregularities caused by photoelasticity and retaining brightness in the display screen 14.

In order to prove the above described effects, a projection image display system having the structure according to this example but having no parallel ray selecting element was produced. Experiments were conducted for comparing the display qualities in this image display system and in the image display system according to this example.

The image display system according to this example used in the experiment had the parallel rays selecting element 4 as shown in FIG. 2. The optical path 4a in this parallel ray selecting element 4 was made from High Becks (brand name; produced by Yokohama Rubber Co., Ltd.; made of aluminum) and covered with a black coating for light absorption. Each optical path 4a had a diameter D of 3 mm and a length L of 30 mm. The liquid crystal display panel 11 used in the experiment had a liquid crystal display element with a ratio of aperture of 30% having a pixel with an aperture in the shape of about 100 μm². A microlens having a focal length of 700 μm is provided so as to position its focal point on the aperture of the pixel in the liquid crystal display panel 11.

The results of the experiments are shown in Table 1 below.

TABLE 1

|  | Display according to this example | Display without parallel ray selecting element |
|---|---|---|
| CCR Value (Light entering the color filter) | 33% | 20% |
| CCR Value (Projected image) | 38% | 38% |
| Brightness | 1.6 | 2.0 |
| Lowest Contrast | 90 | 40 |

The CCR value herein indicates an illuminance distribution irregularity and is defined as a percentage of the lowest illuminance to the highest illuminance. The brightness of the display screen was determined based on the brightness of a projection image display system having neither a microlens array nor parallel ray selecting element.

As is shown in Table 1, the image display system having the parallel ray selecting element 4 has an improved CCR value of light entering the color filter 8 from the light source 1 by 13% and an improved lowest contrast by 50 when compared with the one having no parallel ray selecting element. The results proved that the parallel ray selecting element 4 can improve the CCR value of the light entering the color filter 8 from the light source 1, resulting in a decrease in the temperature distribution irregularity and preventing any decrease in the contrast caused by the photoelectricity. The CCR values in the projected image were 38% in both image display systems.

The brightness of the display screen of the display system having the parallel ray selecting element 4 was 1.6, which was a little darker than that of the display system having no parallel ray selecting element. However, the effect of the microlens array 7 was sufficiently exhibited in the former display system.

From the above-mentioned results, it is found that the projection type image display system according to the present invention provides a uniform and bright image display.

The parallel ray selecting element 4 is not limited to the one used in the above described experiment. The above-mentioned parallel ray selecting element 4 uses a metallurgically processed material having a honeycomb structure, but any material that can select a component with a high degree of parallelization among the entire light components without loss can be used. Other examples for attaining the same effect include a field of view controlling board, LUMISTY (brand name; produced by Sumitomo Chemical Industries) and a Light Control Film (produced by Sumitomo Three M).

Figure 3:
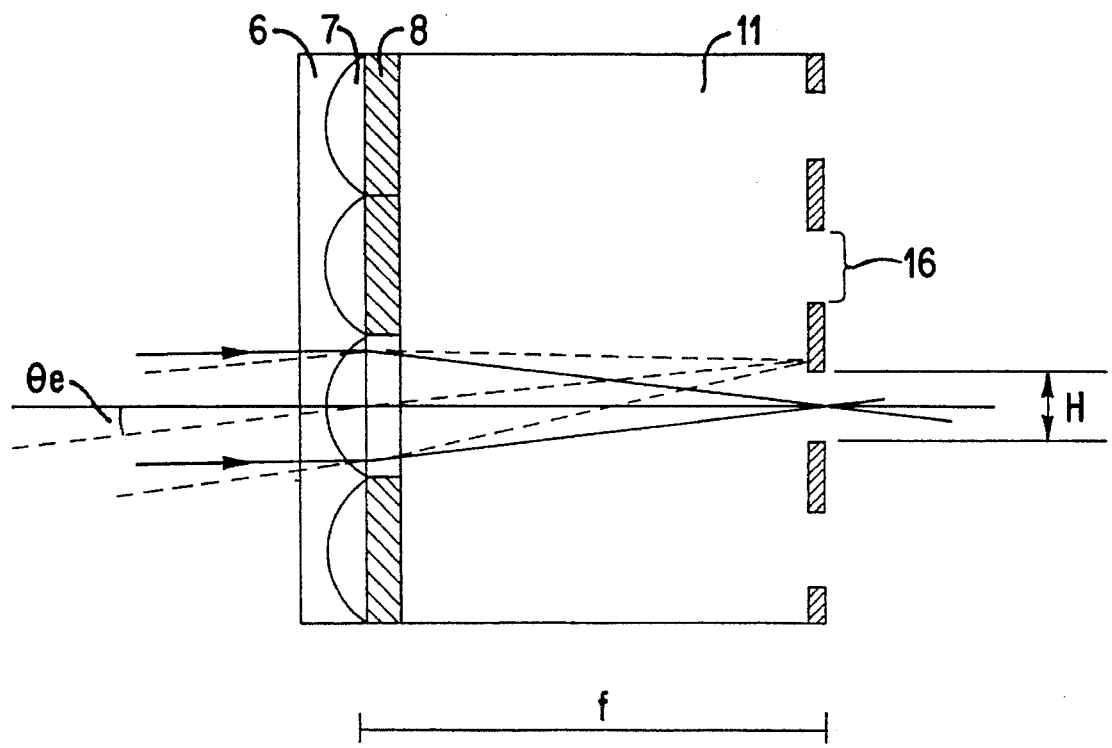
FIG. 3 is a sectional view of a liquid crystal display panel having a microlens array and a color filter.

Moreover, the converging efficiency on the microlens array 7 can be improved with ease by varying the diameter D and the length L of the optical path 4a of the parallel ray selecting element 4. The method for determining these values is as follows:

FIG. 3 is a sectional view of the substrate 6 bearing the microlens array 7 and the liquid crystal display panel 11. As is apparent from FIG. 3, a light angle effective for converging by the microlens array 7 $|\theta_e|$ (hereinafter referred to as the "effective angle") is represented by the following Equation 1:

$$|\theta_e| \leq \tan^{-1} \frac{H}{2F} \qquad \text{Equation 1:}$$

wherein f is a focal length of the microlens array 7 and H is a size of the aperture 16 of a pixel corresponding to each microlens in the microlens array 7. It is presumed that the size of the converging spot of the microlens is so small that it can be regarded to have no area, and that the aperture 16 of the pixel has the shape of a circle.

Therefore, as is apparent from FIG. 2, when a relationship among the maximum value $\theta_{max}$ of the effective angle $\theta_e$ and the diameter D and the length L of the optical path 4a is settled to satisfy the following Equation 2, it is possible to absorb unnecessary light by using the parallel ray selecting element 4 and to effectively utilize the light which can be efficiently converged on the microlens array 7.

$$\frac{D}{L} = \tan \theta_{max} \qquad \text{Equation 2:}$$

Judging from Equations 1 and 2, a relationship among the optical path 4a, the microlens array 7 and the liquid crystal display panel 11 should be determined so as to satisfy the following Equation 3:

$$\frac{D}{L} = \frac{H}{2F}$$ Equation 3:

In the above-mentioned experiment, the ratio of the length L to the diameter D of the optical path 4a of the parallel ray selecting element 4 was determined to be 1:10 so as to selectively utilize the light entering at the effective angle $|\theta_e| \leq 4°$.

When the converging spot of a microlens has a certain area, the range of the effective angle $\theta_e$ depends upon the size of the converging spot and the illuminance distribution. However, the most suitable angle in such a case can be obtained by using the light angle determined in the above described case, where the converging spot has no area, as a standard.

Figure 4:
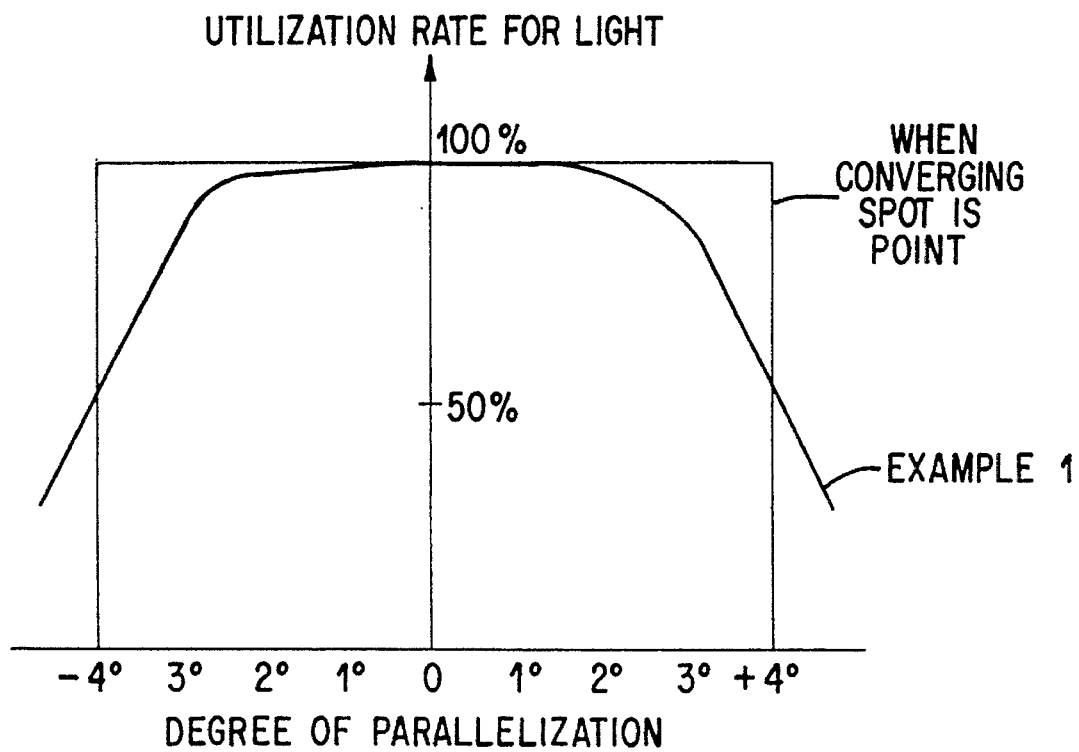
FIG. 4 is a graph showing the relationship between the degree of parallelization and the utilization rate for the light in Example 1 and for a case where the converging spot of a microlens is a point.

FIG. 4 shows a relationship between the degree of parallelization and the utilization rate (%) of the light in a case where the converging spot is a point and in this example. In this example, as in the above described experiment, the focal length f of the microlens array 7 was 700 μm and the size H of the aperture 16 was 100 μm square so as to attain the effective angle $|\theta_e| \leq 4°$. As is shown in FIG. 4, the parallel ray selecting element 4 can reduce the entire amount of the light entering the elements which can be heated by light absorption and retain the brightness of the display screen 14 according to this example. However, the present invention is not limited by the values defined above.

Figure 5A:
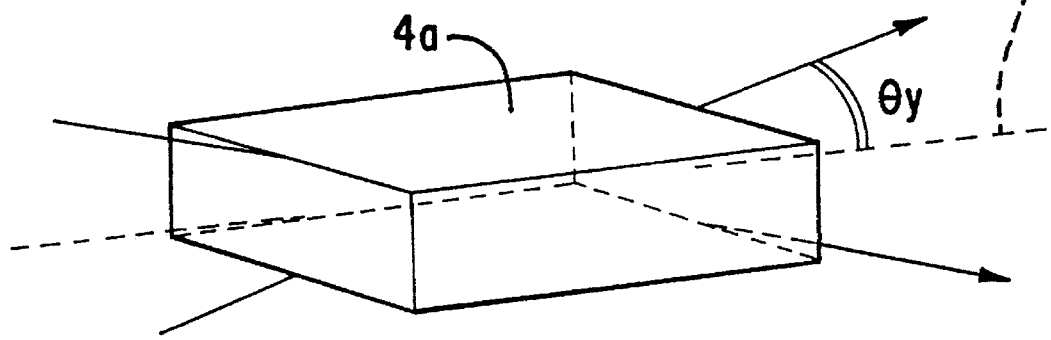
FIG. 5A shows the largest angle θy for a light passing through an optical-path with an optical axis in a first direction of the parallel rays selecting element.
Figure 5B:
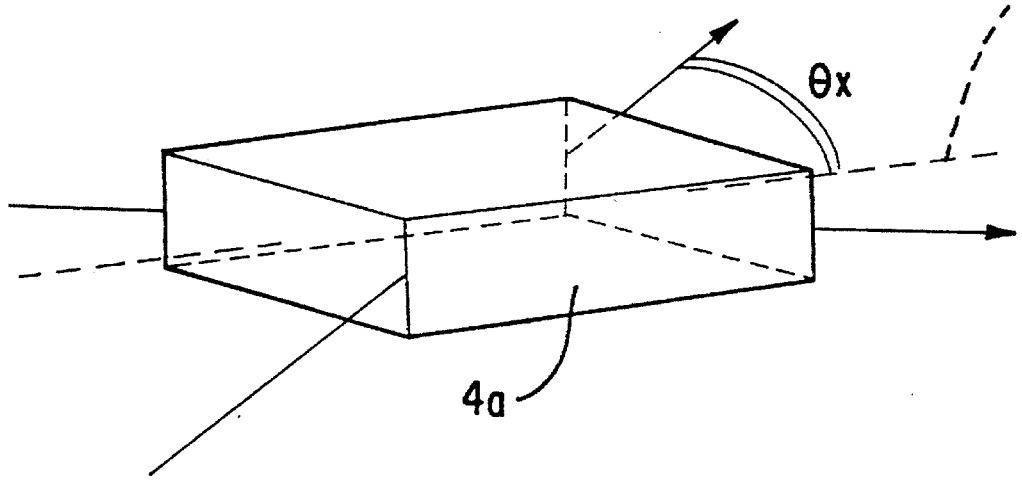
FIG. 5B shows the largest angle θx for a light passing through an optical path with an optical axis in a second direction of the parallel rays selecting element.
Figure 6A:
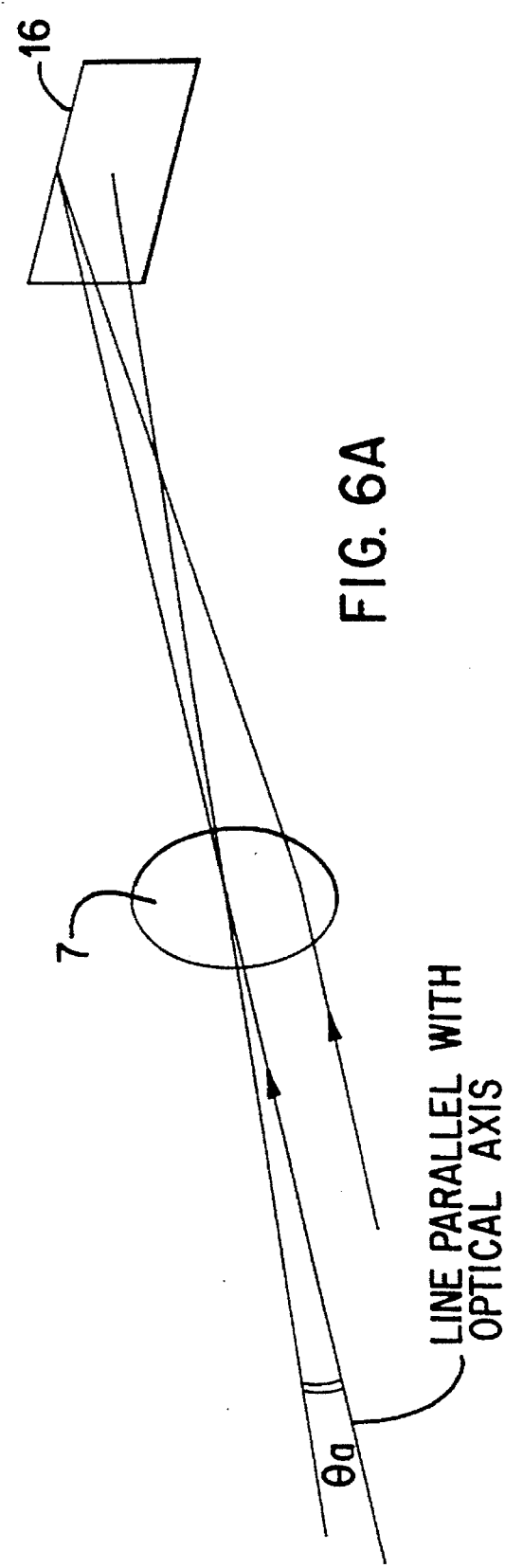
FIG. 6A shows the largest angle θa for a light which can be effectively used in a first direction in an aperture in a pixel by the converging effect of a microlens.
Figure 6B:
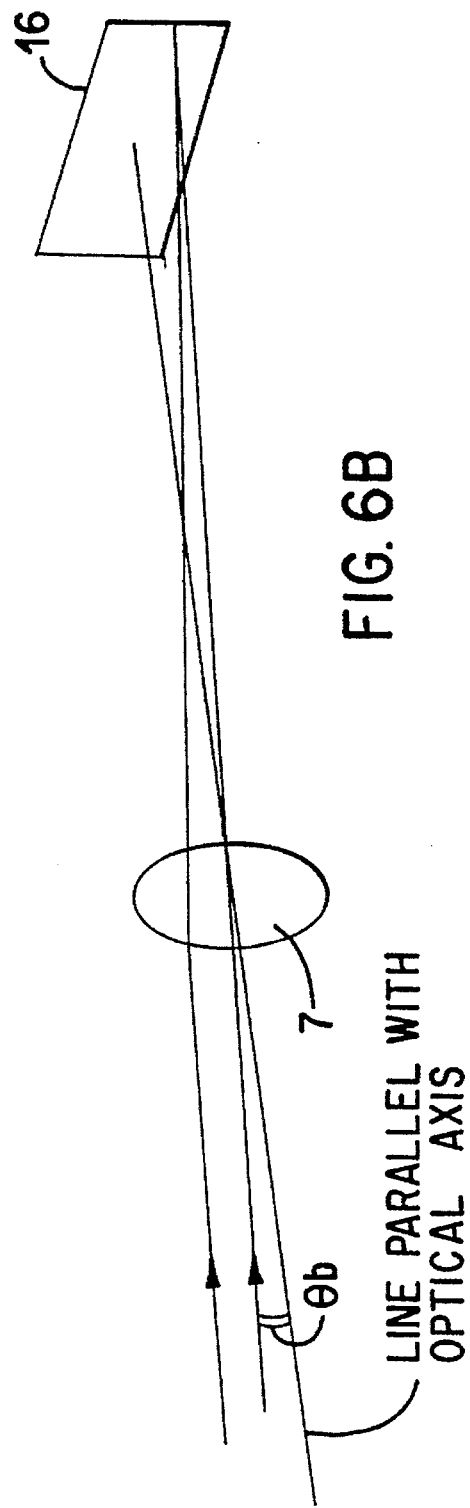
FIG. 6B shows the largest angle θb for a light which can be effectively used in a second direction in an aperture in a pixel by the converging effect of the microlens.

A case where a pixel of the liquid crystal display panel 11 has an aperture in a specific shape will now be described. In the following description, the aperture having a shape in which there is a large difference in the ratio between the height and the width will be described as an example. FIG. 5A shows the largest angle $\theta_y$, with the optical axis, of light passing through the optical path 4a in a first direction (vertical direction), and FIG. 5B shows the largest angle $\theta_x$, with the optical axis, of light passing through the optical path 4a in a second direction (horizontal direction). FIG. 6A shows the largest angle $\theta_a$, with the optical axis, of light which can be effectively used in the first direction of the aperture 16 of the pixel, and FIG. 6B shows the largest angle $\theta_b$, with the optical axis, of light which can be effectively used in the second direction. In order to utilize light most efficiently, $\theta_y$ and $\theta_x$ should be identical to $\theta_a$ and $\theta_b$, respectively.

The aperture 16 of the pixel in the liquid crystal display panel 11 can take any shape. More effective convergence can be attained when the shape of the aperture of the parallel ray selecting element 4 is chosen to be similar to that of the pixel.

Example 2

Figure 7:
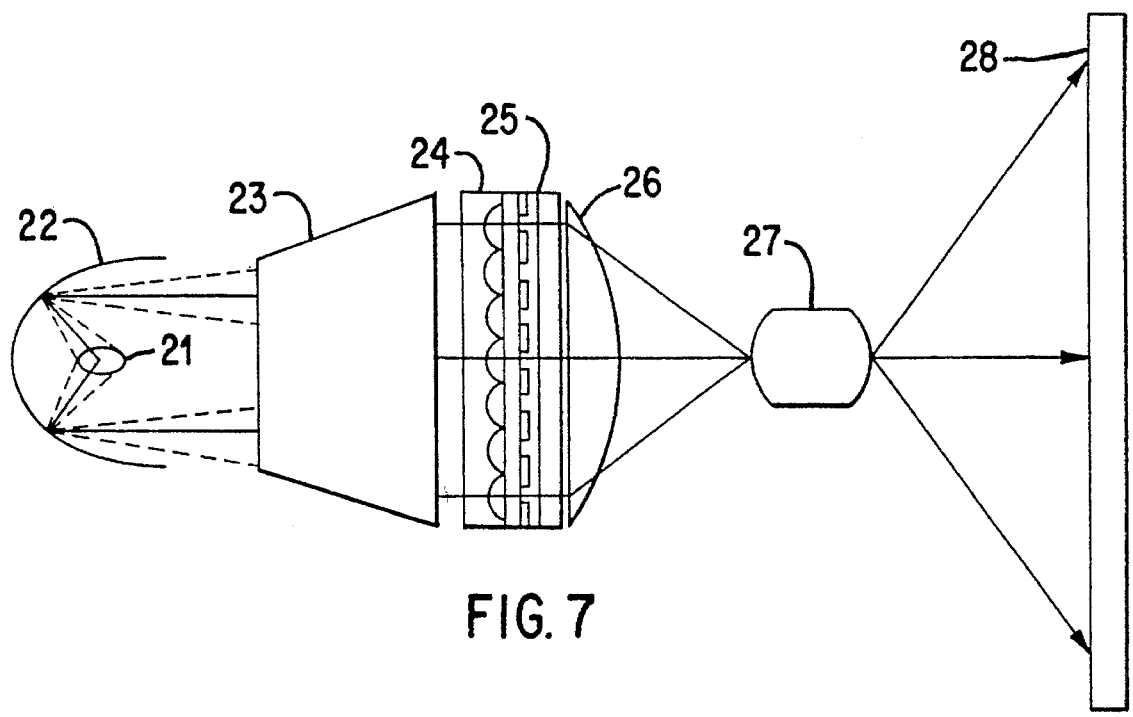
FIG. 7 shows a structure for a projection type image display system according to Example 2 of the present invention.

FIG. 7 shows a schematic structure for a projection type image display system according to this example. In this projection type image display system, a light source 21 is provided at the focal point of a parabolic mirror 22, and a tapered fiber 23 is provided on the other side of the parabolic mirror 22 with respect to the light source 21. On the other side of the light source 21 with respect to the tapered fiber 23, a microlens array 24, a liquid crystal display panel 25 and a field lens 26 are provided so that the beam emitted by the light source 21 passes through them in this order. On the focal point of the field lens 26 is provided a projection lens 27, through which an image formed by the liquid crystal display panel 25 is projected on a projection screen 28.

Examples of the light source 21 include a metal halide lamp, a halogen lamp, a xenon lamp and the like. The parabolic mirror 22 is provided in order to reflect light emitted by the light source 21 toward the other side from the tapered fiber 23 to direct it toward the tapered fiber 23. The tapered fiber 23 can be made of one fiber, but generally, a plurality of fibers are tied up in a bundle to provide a desired size, thereby forming a shape having different diameters at both ends. The tapered fiber 23 is provided in a manner that the diameter nearer to the light source 21 (hereinafter referred to as the "light source end diameter") is smaller than that nearer to the display panel 25 (hereinafter referred to as the "display panel end diameter"). Thus, the light reflected by the parabolic mirror 22 enters the end portion of the tapered fiber 23 nearer to the light source 21. The light source end diameter is not specifically limited, and is appropriately about 5 mm to 100 mm, considering the size of an ordinary display panel and the desired degree of parallelization. The size of the display panel end diameter of the tapered fiber 23 is sufficient if it is larger than the light source end diameter. When the display panel end diameter is as large as the liquid crystal display panel 25, more light with a higher degree of parallelization is allowed to enter the liquid crystal display panel 25. The tapered fiber with a display panel end diameter of approximately 30 mm can be used both in this example and in Example 3 described below, in which an elliptical reflecting mirror is used.

Figure 8:
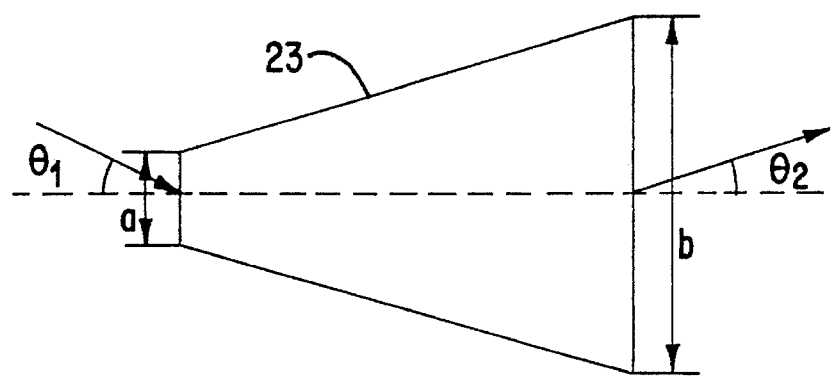
FIG. 8 shows an optical path for light before and after entering a tapered fiber in the shape of a truncated cone.

A relationship between the light source end diameter and the display panel end diameter of the tapered fiber 23 will now be described. FIG. 8 shows an optical path of light entering the tapered fiber 23 in the shape of a truncated cone.

As is shown in FIG. 8, it is presumed herein that the end portions of the tapered fiber 23 are in the form of a circle, and that the light source end diameter and the display panel end diameter are taken as a and b, respectively, where a<b. When the angle of light entering the tapered fiber 23 is taken as $\theta_1$ (0°<$\theta_1$<90°) and the angle of the light outgoing therefrom is taken as $\theta_2$ (0°<$\theta_2$<90°), the relationship between $\theta_1$ and $\theta_2$ is represented by the following Equation 4:

Equation 4:

$$n_1 \times a \times \sin\theta_1 = n_2 \times b \times \sin\theta_2$$

wherein $n_1$ and $n_2$ are refractive indexes of materials in contact with the light source end and the display panel end, respectively. When $n_1 = n_2$ in Equation 4, the following Equation 5 holds:

Equation 5:

$$a \times \sin\theta_1 = b \times \sin\theta_2$$

Since a is smaller than b, $\sin\theta_1 > \sin\theta_2$ and $\theta_1 > \theta_2$. Therefore, the degree of parallelization of the light outgoing from the tapered fiber 23 is higher than that of the light entering the tapered fiber 23. "A high degree of parallelization" herein means that the angle $\theta_2$ in FIG. 8, which is made by the outgoing light and the optical axis, is small. As is apparent from Equation 5, when $\theta_1$ remains constant, the larger the ratio of the light source end diameter a to the display panel end diameter b becomes, the smaller $\theta_2$ becomes. This indicates that a larger ratio of the light source end diameter a to the display panel end diameter b results in outgoing light with a higher degree of parallelization.

The following experiment was conducted to evaluate the effect of this example.

The experiments were conducted by using the projection type image display system as shown in FIG. 7 and one having the same structure but no tapered fiber. A metal halide lamp with an arc length of 5 mm (produced by Ushio Inc.), and a tapered fiber with a light source end diameter of 30 mm and a display panel end diameter of 80 mm were used. The liquid crystal display panel used in this experiment had a ratio of aperture of 40%.

Under the above-mentioned conditions, when the degree of parallelization of the light reflected by the parabolic mirror 22 is about ±9°, the degree of parallelization of the light having passed through the tapered fiber 23 is presumed to be about ±3.4° from Equation 5. The illuminance on the projection screen 28 was measured in the two image display systems. The illuminance in the display system having the tapered fiber 23 was about 1.6 times of that in the display system without the tapered fiber. Thus, the improvement in illuminance in the display system according to this example was confirmed.

The results of the above-mentioned experiments show that the microlens array 24 can sufficiently exhibit its effect by using the tapered fiber 23, resulting in an improved illuminance on the projection screen 28.

The light source 21 was shifted toward the tapered fiber 23 in order to avoid a dark spot of the light reflected by the parabolic mirror 22. As a result, even if the reflected beam has a lower degree of parallelization, the microlens array 24 exhibited its effect sufficiently since the tapered fiber 23 allows only the light with a high degree of parallelization to outgo therefrom. The CCR value of the image formed on the projection screen 28 in the display system with the tapered fiber 23 was about 50%, while that of the image formed in the display system without the tapered fiber was about 30%. Thus, the CCR value is also largely improved in this example.

Example 3

In this example, the present invention is applied in a projection type image display system having a lighting device using an elliptical mirror.

In the structure of the projection type image display system shown in FIG. 7, the parabolic mirror 22 is replaced by an elliptical mirror, and the light source 21 and the tapered fiber 23 were positioned on the first focal point and the second focal point of the elliptical mirror, respectively. The same effects as those described in Example 2 were obtained in this structure.

There are several methods for forming the microlens array 24. Among them, a method in which a distributed index lens is formed by a selective ionic diffusion is known as a typical method. In this method, a glass plate is dipped in fused salt, and an ion exchange of dissimilar ions such as alkaline ions is caused between the glass plate and the fused salt through a mask pattern formed on the glass plate. Thus, a glass plate having a distributed refractive index corresponding to the mask pattern is obtained. Since the surface of the microlens formed on the glass plate in this method is uneven, it can be adhered to a liquid crystal display panel sandwiching no air therebetween by using Canada balsam or a photo-curing resin. Therefore, the reflection loss on the surface of the substrate can be extremely decreased. This method is disclosed in Electronics Letters Vol. 17, No. 13, p. 452 (1981).

Example 4

Figure 9:
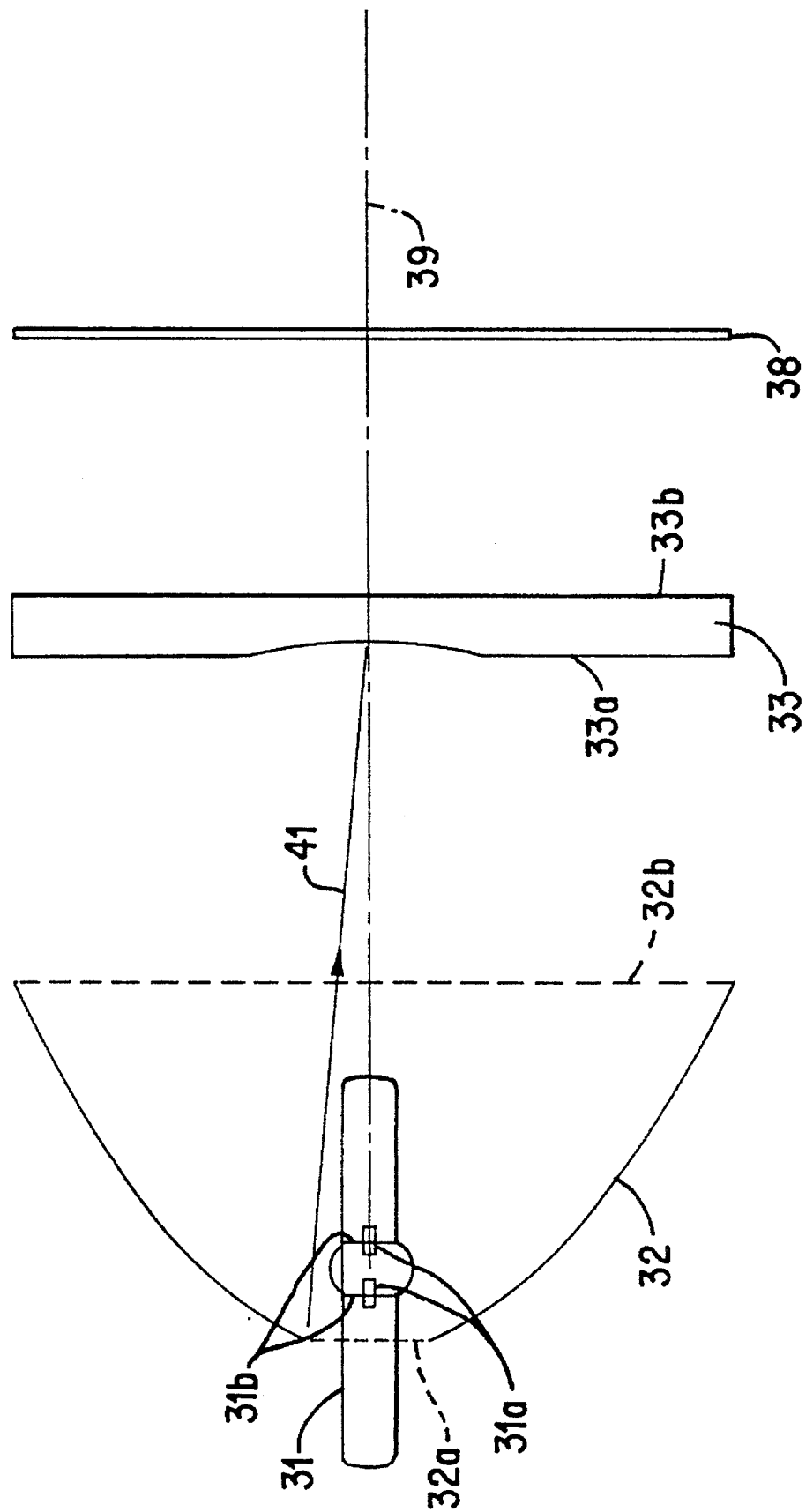
FIG. 9 shows a structure for a lighting device according to Example 4 of the present invention.

FIG. 9 shows a structure for a lighting device according to this example. In this lighting device, a light source 31 is inserted through an opening 32a in the shape of a circle in the center of a parabolic mirror 32. A compensating lens 33 is provided in the direction in which light reflected by the parabolic mirror 32 proceeds. The rotation axis of the parabolic mirror 32 and the central axis of the compensating lens 33 correspond to an optical axis 39. A lighted portion 38 is provided on the other side of the light source 31 with respect to the compensating lens 33.

A discharge lamp such as a xenon lamp, a metal halide lamp and the like is used as the light source 31. Such a lamp has a light emitting portion 31a, that is, a linear portion between arcs and shading portions 31b such as electrodes and a lead. The lamp is inserted through the opening 32a so that the arcs correspond with the optical axis 39 and that the light emitting portion 31a between the arcs is positioned on the focal point of the parabolic mirror 32. In this example, a metal halide lamp having the light emitting portion 31a with a length of 3 mm is used as a light source 31.

The parabolic mirror 32 is a body of rotation having the optical axis 39 as a rotation axis, having an inner surface of a mirror, and has the circular opening 32a for inserting the light source 31 in its center and an opening 32b for allowing the light to outgo therefrom. The parabolic mirror 32 used in this example has a focal length of 13 mm, the opening 32a has a diameter of 18 mm, and the opening 32b has a diameter of 110 mm.

The compensating lens 33 is made from acrylic and is used to change incident light into parallel rays. A lens face 33a facing the light source 31 has a shape dented toward the center, and a lens face 33b facing the lighted portion 38 is plane. The compensating lens 33 is provided away from the opening 32a of the parabolic mirror 32 by 112 mm. The distance between the compensating lens 33 and the lighted portion 38 is 30 mm.

In this lighting device, the light emitted by the light source 31 is reflected by the parabolic mirror 32, and passes through the compensating lens 33 to be changed into parallel rays to enter the lighted portion 38.

A method for adjusting the shape of the lens face 33a of the compensating lens 33 which serves as described above will now be described referring to FIG. 10.

Figures 10, 11:
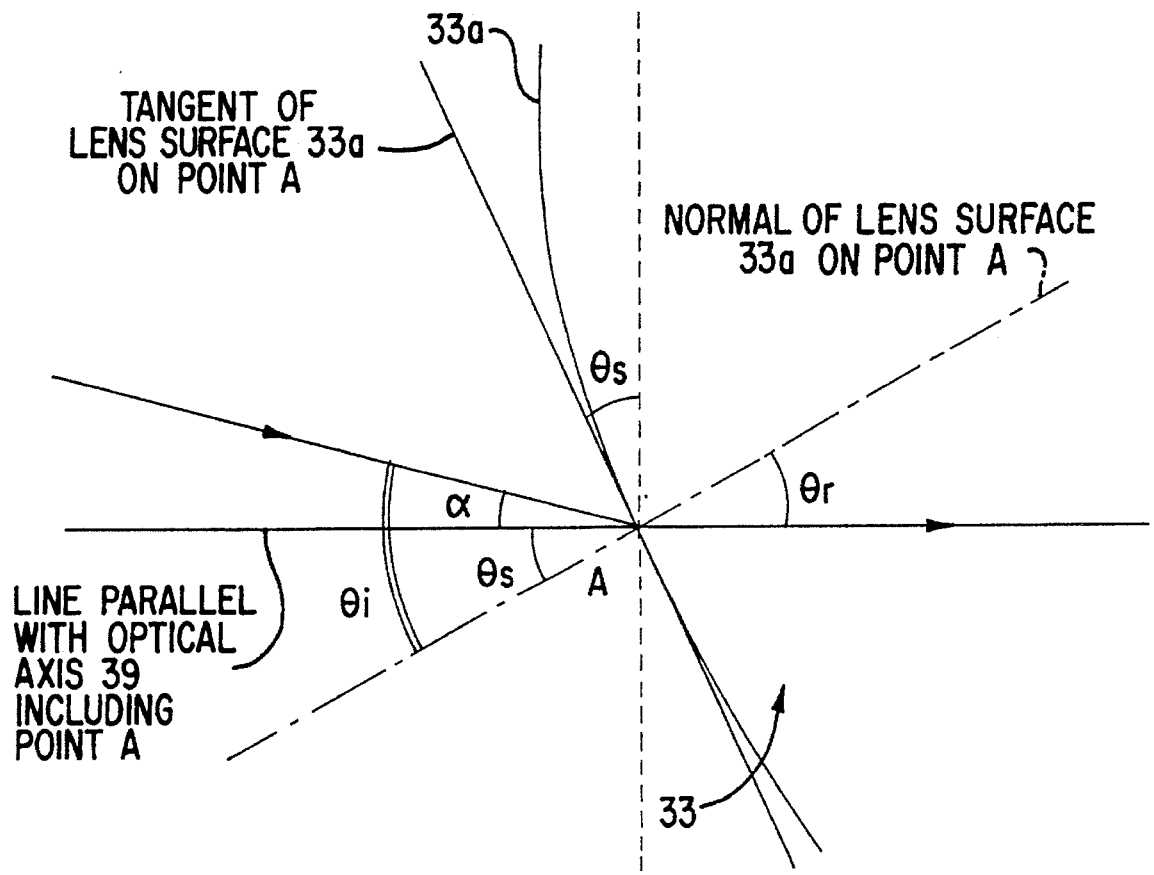
FIG. 10 is a diagram showing the refraction of light by the compensating lens shown in FIG. 9.
FIG. 11 is a sectional view of an example of the compensating lens.

FIG. 10 is a diagram showing a case where light having an angle $\alpha$ with the optical axis 39 enters a point A on the lens face 33a of the compensating lens 33 to be refracted in parallel to the optical axis 39. FIG. 10 is a sectional view on a meridian plane including the point A, on which the light is refracted. The incident angle into the lens face 33a is taken as $\theta_i$, and the refracting angle is taken as $\theta_r$. When the refractive index of an external medium around the surface of the lens face 33a is taken as $n_3$ and the refractive index of the compensating lens 33 is taken as $n_4$, the following Equation 6 holds from Snell's law:

$$\frac{\sin\theta_i}{\sin\theta_r} = \frac{n_4}{n_3} \qquad \text{Equation 6:}$$

An angle made at the point A between the normal of the lens face 33a and a line parallel to the optical axis 39 including the point A (hereinafter referred to as the "gradient") is taken as $\theta_s$. As is evident from FIG. 10, $\theta_i = \theta_s + \alpha$ and $\theta_r = \theta_s$. These values are substituted in Equation 6 to obtain the following Equation 7:

$$\frac{\sin(\theta_s + \alpha)}{\sin\theta_s} = \frac{n_4}{n_3} \qquad \text{Equation 7:}$$

As a result, the following equations are obtained:

$$\sin(\theta_s + \alpha) = \frac{n_4}{n_3} \sin\theta_s$$

$$\sin\theta_s \cos\alpha + \cos\theta_s \sin\alpha = \frac{n_4}{n_3} \sin\theta_s$$

When the both members of the above equation are divided by $\sin\theta_s$, $$\cos\alpha + \frac{\sin\alpha}{\tan\theta_s} = \frac{n_4}{n_3}$$

$$\tan\theta_s = \frac{\sin\alpha}{\frac{n_4}{n_3} - \cos\alpha}$$

Equation 8:
$$\theta_s = \tan^{-1}\left( \frac{\sin\alpha}{\frac{n_4}{n_3} - \cos\alpha} \right)$$

Therefore, when the gradient $\theta_s$ of the lens face 33a is determined so as to satisfy Equation 8 based on the angles of the incident light in each point on the lens face 33a, the refracted light can be made parallel to the optical axis 39.

For example, a method for determining the gradient $\theta_s$ of the lens face 33a in the center of the compensating lens 33 is as follows. In the following description, the gradient $\theta_s$ is determined based on light having the smallest angle $\alpha$ with the optical axis 39, i.e., having the highest degree of parallelization among the light reaching the center of the compensating lens 33 after being reflected by the parabolic mirror 32.

In this case, light 41 shown in FIG. 9 is considered to have the highest degree of parallelization. The light 41 is reflected by a portion around the opening 32a on the parabolic mirror 32. Because of the shading portions 31b, no light directly reaches the center of the compensating lens 33 without being reflected by the parabolic mirror 32. At this point, the magnitude of the angle $\alpha$ made between the light 41 and the optical axis 39 is obtained from the size of the opening 32a and the positions of the parabolic mirror 32 and the compensating lens 33 as follows:

Equation 9:
$$\alpha = \tan^{-1} \frac{(\text{Semidiameter of Opening } 32a)}{\left( \begin{array}{c} \text{Distance between Opening } 32a \\ \text{and Compensating Lens } 33 \end{array} \right)}$$

$$= \tan^{-1} \frac{9 \text{ mm}}{112 \text{ mm}} = 4.6°$$

The obtained value is substituted in Equation 8 to calculate the magnitude of the gradient $\theta_s$. The angle $\alpha$ varies depending upon the shape of the shading portions 31b of the light source 31, and therefore, the gradient $\theta_s$ of the lens face 33a is increased as the shading portion 31a is enlarged.

The method for determining the gradient $\theta_s$ of the lens face 33a is not limited to the above-mentioned method based on the light with the highest degree of parallelization. Light can be appropriately selected from the angle distribution of the light reaching respective points on the lens face 33a as a standard, and the gradient $\theta_s$ at that point can be determined by using Equation 8.

The magnitude of the gradient $\theta_s$ depends upon, as is evident from the above-mentioned determined method, the position of the compensating lens 33 with respect to the light source 31 and the parabolic mirror 32. This is because the angle $\alpha$ made between the optical axis 39 and the light emitted by the light source 31 to be reflected by the parabolic mirror 32 varies depending upon the position of the compensating lens 33 with respect to the light source 31 and the parabolic mirror 32.

When the gradient $\theta_s$ is determined in the above-mentioned manner, the compensating lens 33 is a body of rotation having the optical axis 39 as a rotation axis, the gradient $\theta_s$ is nearly 0 in the peripheral portion of the compensating lens 33 and becomes larger toward the center thereof. Namely, the lens face 33a has a dent point in its center and has an approximately plane surface in the peripheral portion for the following reason: Light reflected by the parabolic mirror 32 is likely to be converged on and enters the center of the lens face 33a. Light reaching the peripheral portion of the lens face 33a is not required to be compensated because such light is emitted from the position of the focal point of the parabolic mirror 32 and is almost parallel to the optical axis 39 when it enters the compensating lens 33.

In this example, the thickness of the compensating lens 33 is slightly thinner toward its peripheral portion, and therefore, the peripheral portion of the compensating lens 33 serves just as a convex lens. Thus, light which is likely to scatter away from the optical axis 39 is made to enter the lighted portion 38, thereby increasing the utilization rate of the light.

In this example, the compensating lens 33 is made from acrylic with a refractive index of 1.49 but the compensating lens can be made from glass. As a material for the compensating lens 33, a moldable transparent resin is easy to handle. A material with sufficient heat resistance is preferred since the compensating lens 33 can be melted by the heat from the light source 31, depending upon the kind of the light source 31 and the distance between the light source 31 and the compensating lens 33. In addition, a heat cuttting filter is preferably provided between the light source 31 and the compensating lens 33.

In this example, since the thickness of the compensating lens is less than 3 mm, the lens face 33a is formed as in a continuous surface. When the compensating lens 33 is thick, the lens face 33a can be formed in a shape having a discontinuous surface as shown in FIG. 11 to obtain a Fresnel lens having an identical refractive index to that of the lens with a continuous surface. Alternatively, the lens face 33a of the compensating lens 33 facing the light source 31 can be plane, and the lens face 33b facing the lighted portion 38 is made into the shape as described above based on Snell's law.

When the lighted portion 38 has a large area, the focal length of the parabolic mirror 32 is lengthened so that the parabolic mirror 32 has a gently curved surface. When the light source 31 does not protrude from the opening 32b of the parabolic mirror 33, the compensating lens 33 can be fixed on the opening 32b of the parabolic mirror 32. Even in such cases, the gradient $\theta_s$ of the lens face 33a of the compensating lens 33 is determined by the above-mentioned method. The lighted portion 38 can be disposed adjacent to the compensating lens 33 without having a distance from the compensating lens 33 differently from the structure shown in FIG. 9.

The degree of parallelization of the entire light can be improved according to the above described structure. Moreover, since the lighting device of the present example has the compensating lens 33, even when the position of the light emitting portion of the light source 31 is finely adjusted by shifting it toward the compensating lens 33 so as to avoid the dark spot of light, light with a high degree of parallelization can be obtained in the center of the lighted portion 38. Further, less light is concentrated on the center of the lighted portion 38 due to the refraction by the compensating lens 33, thereby decreasing the irregularity in the illuminance distribution.

The lighting device can be minimized by adopting such a structure. In a conventional lighting device having the structure as shown in FIG. 9 except for the compensating lens 33, when light with a degree of parallelization of less than 1° is required at the center of the lighted portion 38, the distance between the opening 32a of the parabolic mirror 32 and the lighted portion 38 is calculated by using Equation 9 described above in the follow manner:

$$\frac{9 \text{ mm}}{\tan 1°} = 516 \text{ mm} \qquad \text{Equation 10:}$$

On the other hand, in this example, since the degree of parallelization of the light is improved to be approximately 0° by the compensating lens 33 and the lighted portion 38 can be positioned adjacent to the compensating lens 33, a shorter distance than the above can be realized.

In this example, the parabolic mirror 32 is used as a reflecting mirror. However, any reflecting mirror which is a body of rotation having the optical axis 39 as the rotating axis, including a spherical one and a non-spherical one such as an elliptical reflecting body, can be used. In such cases, a light tracking simulation is first conducted by a computer on the basis of the shape of the reflecting mirror to be used, the position of the light source 31 and the angle distribution of the light emitted by the light source 31, thereby obtaining an incident angle distribution of the light entering the lens face 33a of the compensating lens 33. Next, the gradient $\theta_s$ of the lens face 33a is determined based on the obtained incident angle distribution by the above-mentioned method so as to improve the degree of parallelization of the light.

When the shading portions 31b such as the electrode and the lead are provided on the optical axis 39 as in this example, the compensating lens 33 always has a shape having a dent point in the center of the lens face 33a regardless of the shape of the reflecting mirror. A reflecting mirror in any shape can attain the same effects accomplished by the parabolic mirror.

Example 5

Figure 12:
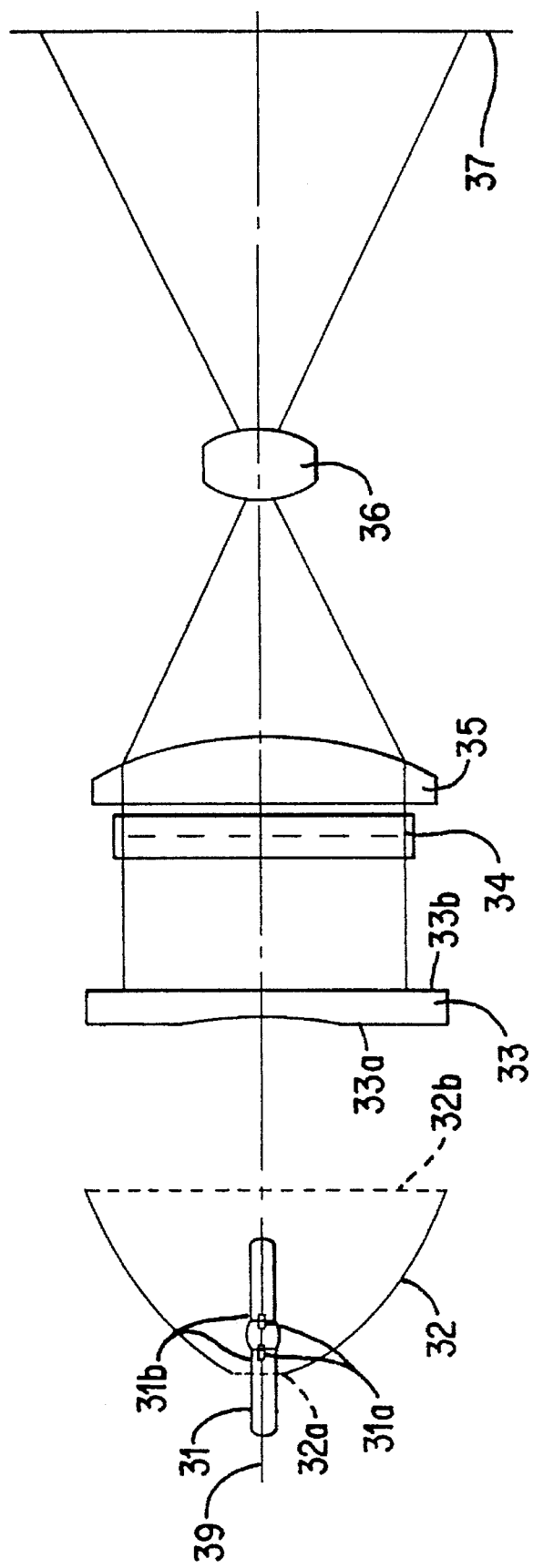
FIG. 12 shows a structure for a projection type image display system according to Example 5 of the present invention.

FIG. 12 shows a structure for a projection type image display system according to this example. In this image display system, the lighting device having the light source 31, the parabolic mirror 32 and the compensating lens 33 as shown in FIG. 9 is used. The lighted portion 38 is replaced with a liquid crystal display element 34. A condenser lens 35, a projection lens 36 and a screen 37 are provided in this order in the other side of the compensating lens 33 with respect to the liquid crystal display element 34.

In an image display system having the above-mentioned structure, the light emitted by the light source 31 is reflected by the parabolic mirror 32, and changed into parallel rays by the compensating lens 33 to enter the liquid crystal display element 34. Then, an image is formed by the liquid crystal display element 34, and projected on the screen 37 through the condenser lens 35 and the projection lens 36.

In this example, the light entering the liquid crystal display element 34 has a high degree of parallelization and few illuminance irregularities, thereby accomplishing a bright and uniform projected image.

In the projection type image display system shown in FIG. 12, the liquid crystal display element 34 has one of the following structures to attain the same effect: A liquid crystal display panel 34a and a microlens array 34b corresponding to respective pixels as is shown in FIG. 13; the liquid crystal display panel 34a and a color filter 34c corresponding to respective pixels as is shown in FIG. 14; and the liquid crystal display panel 34a, the microlens array 34b and the color filter 34c corresponding to respective pixels as is shown in FIG. 15.

Figure 13:
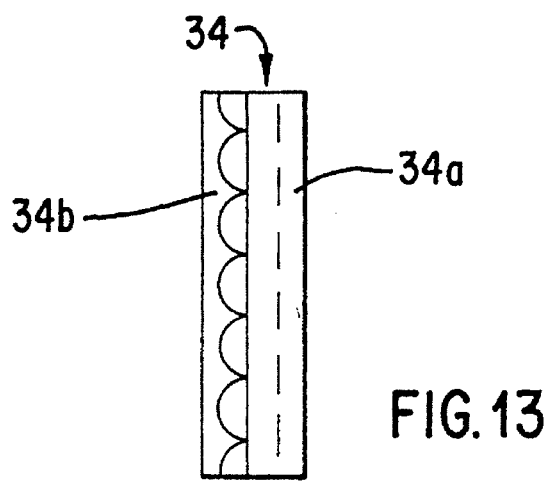
FIG. 13 is a diagram showing a liquid crystal display element having a microlens array.

As described above, the satisfactory degree of parallelization of the light is significant in the liquid crystal display panel 34a having the microlens array 34b shown in FIG. 13. Since the degree of parallelization of the light is improved in this example, the light converged by the microlens array 34b accurately enters the aperture of the pixel of the liquid crystal display panel 34a. Particularly in the center of the screen, the effective ratio of aperture is further improved due to the microlens array 34b as compared with the conventional display system.

Figure 14:
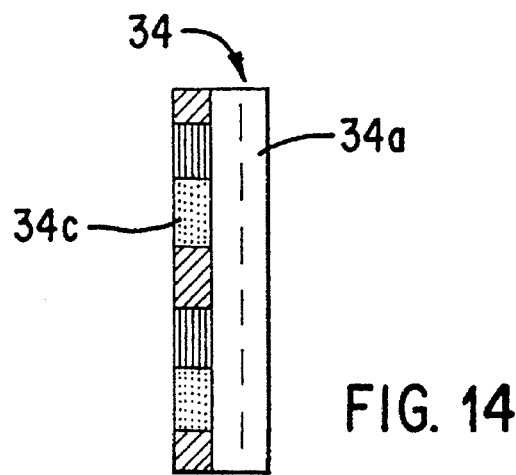
FIG. 14 is a diagram showing a liquid crystal display element having a color filter.

A uniform illuminance distribution of the light is significant in the liquid crystal display panel 34a having the color filter 34c shown in FIG. 14. Since the dark spot of the light is avoided and the irregularity of the illuminance distribution is prevented in this example, the photoelasticity caused by uneven illuminance and color irregularity of the projected image caused by uneven fading of the color filter 34c are prevented.

Figure 15:
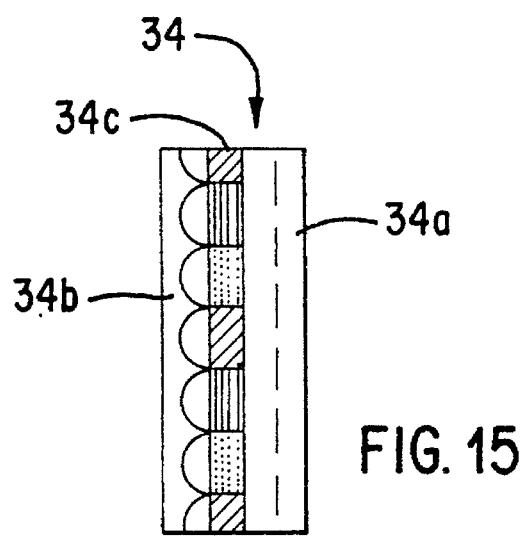
FIG. 15 is a diagram showing a liquid crystal display element having a microlens array and a color filter.
Figure 16:
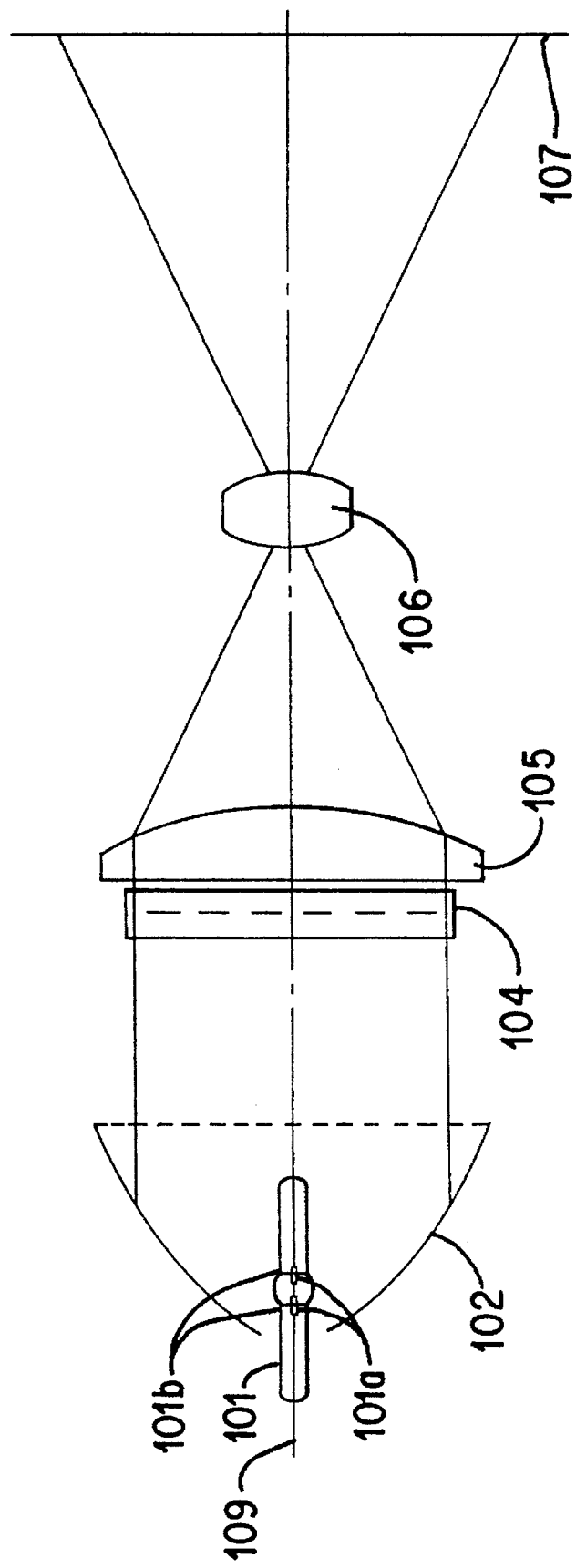
FIG. 16 shows a structure for a conventional projection type image display system.
Figure 17:
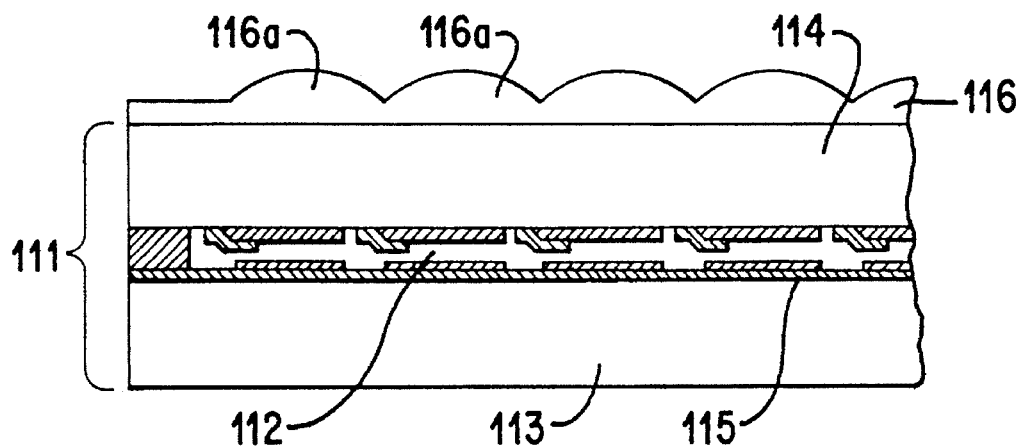
FIG. 17 is a sectional view for a conventional liquid crystal display element having a microlens array.
Figure 18:
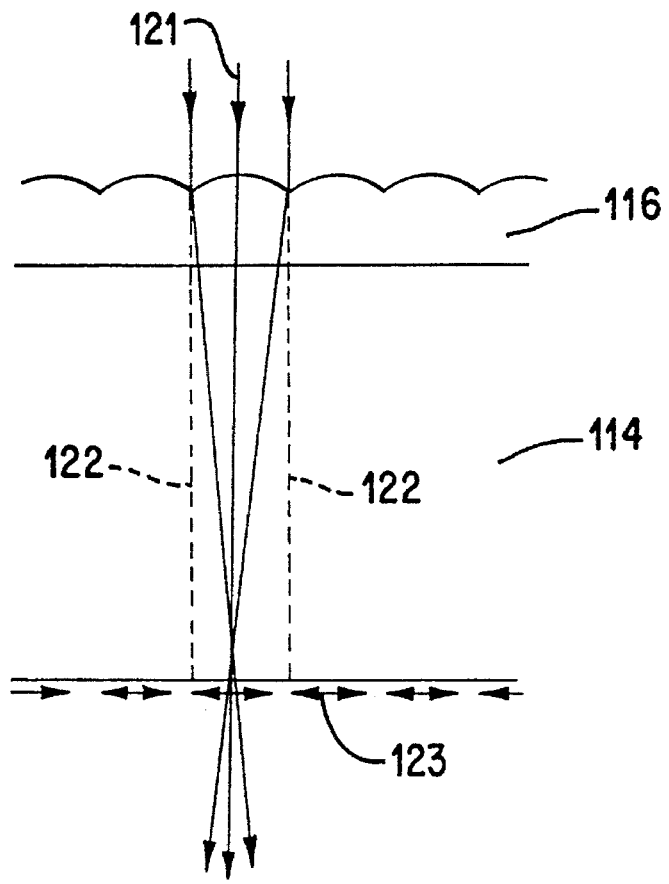
FIG. 18 shows the optical path of an incident light in the liquid crystal display element shown in FIG. 17.
Figure 19:
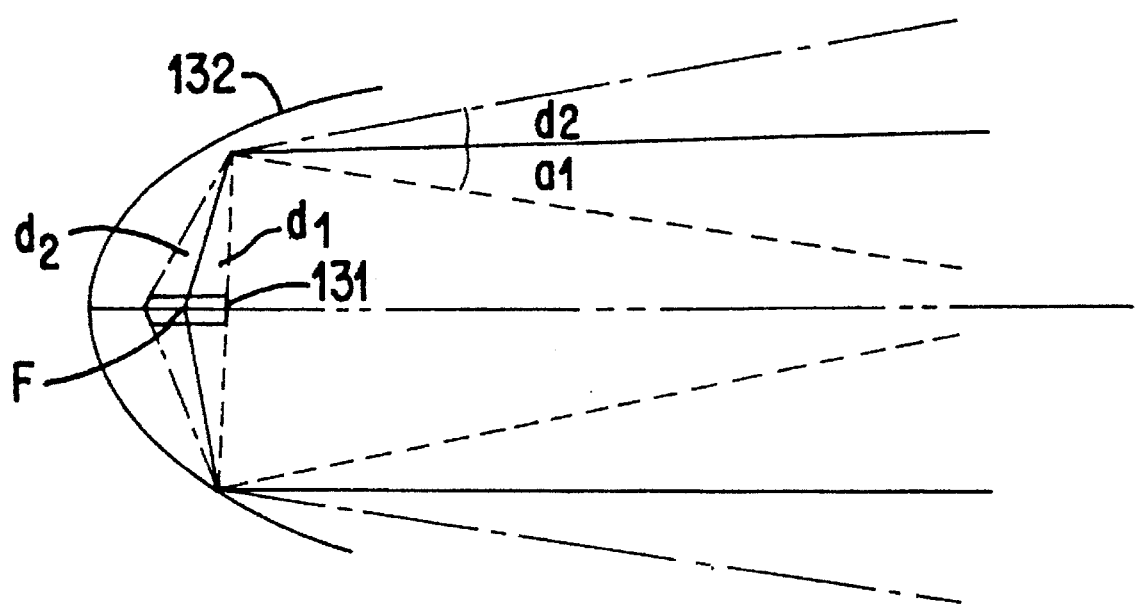
FIG. 19 is a diagram showing a lighting device using a parabolic mirror.
Figure 20:
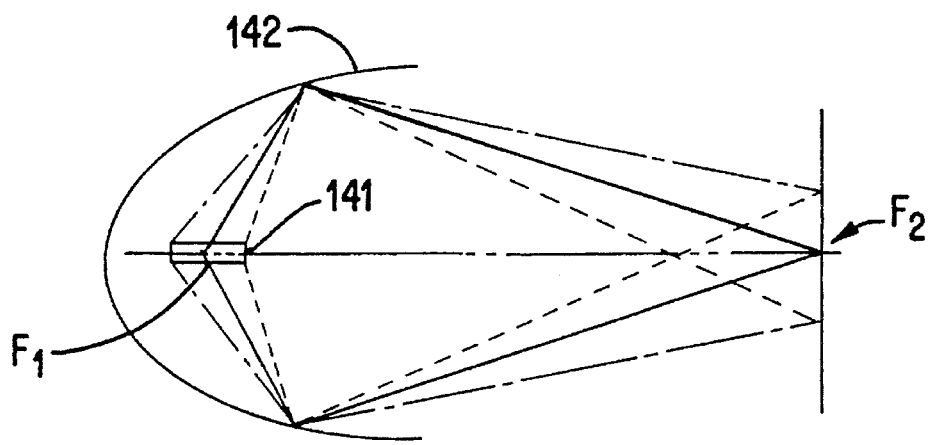
FIG. 20 is a diagram showing a lighting device using an elliptical mirror.
Figure 21:
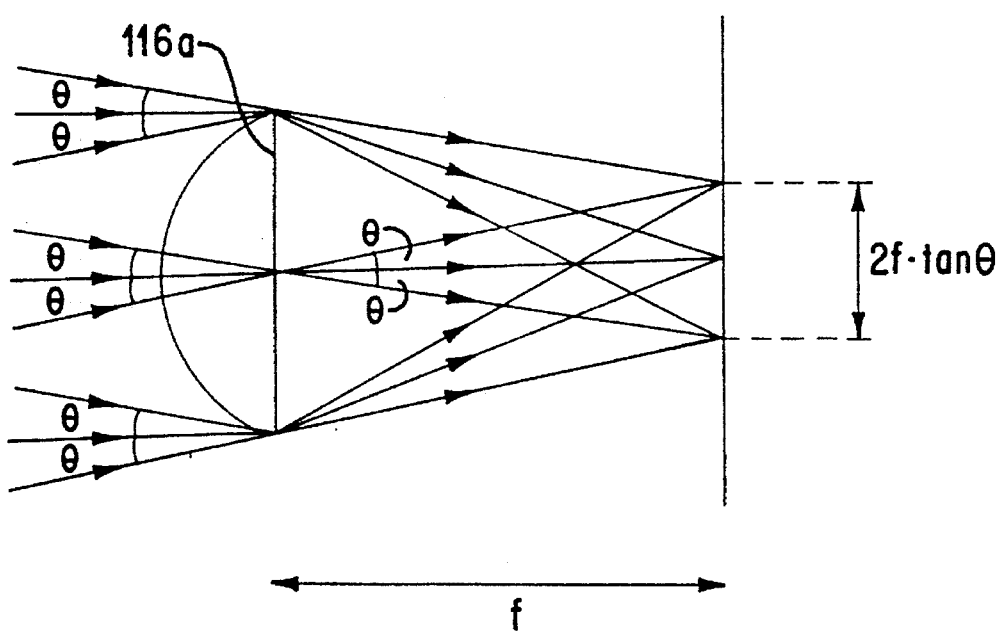
FIG. 21 is a diagram showing the path of incident light through a microlens.

In the liquid crystal display panel 34a having the microlens array 34b and the color filter 34c shown in FIG. 15, a bright image can be attained by the microlens array 34b, and irregularity in the contrast caused by the photoelasticity is prevented, thereby obtaining a projected image with high quality.

Also in this example, a Fresnel lens as shown in FIG. 11 can be used as the lens face 33a of the compensating lens 33 to accomplish the same effects.

Example 6

In this example, a projection type image display system with the lighting device described in Example 4 having the parallel ray selecting element described in Example 1 will be described. This projection type image display system has a structure as shown in FIG. 12 and further has the parallel ray selecting element 4 as shown in FIG. 2 between the compensating lens 33 and the liquid crystal display element 34.

A combination of the compensating lens and the parallel ray selecting element further improves the effect of improving the image quality than in Example 5. This effect is more remarkable when the light source to be used has a larger light emitting portion for the following reason: In the light emitted by the light source, the number of light components parallel to the optical axis is increased by the compensating lens, and then the light effective in projecting an image alone can be introduced into the liquid crystal display element 34 by the parallel ray selecting element.

The projection type image display system according to the present invention is not limited to the structures described in the above examples. Any projection type image display system requiring parallel rays can use the lighting device having any of the above-mentioned structures to attain the same effects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A lighting device comprising:
   a light source;
   a reflecting means for reflecting light emitted by the light source in a determined direction; and
   a compensating means for receiving the light reflected from the reflecting means and allowing the light to outgo in the form of parallel rays,
   wherein the compensating means is a tapered fiber to which the light is directed, one end face of the tapered fiber nearer to the light source being smaller than the other end face thereof.

2. A lighting device according to claim 1, wherein the reflecting means is a reflecting mirror, the reflecting mirror having a shape of a body of rotation and having an optical axis as a rotation axis.

3. A lighting device comprising:
   a light source;
   a reflecting means for reflecting light emitted by the light source in a determined direction; and
   a compensating means for receiving the light reflected from the reflecting means and allowing the light to be output in the form of parallel rays,
   wherein the compensating means is a compensating lens, the compensating lens having a shape of a lens face in which an angle between the normal of the lens face and a line parallel to the optical axis of the compensating lens is nearly zero at each point in the peripheral portion of the lens face of the compensating lens, and the angle becomes larger toward the center thereof.

4. A lighting device according to claim 3, wherein the compensating lens is a Fresnel lens.

5. A lighting device according to claim 3, wherein the reflecting means is a reflecting mirror, the reflecting mirror having a shape of a body of rotation and having an optical axis as a rotation axis.

6. A projection type image display system comprising a lighting device and a display element for forming an image by receiving light from the lighting device, the lighting device comprising:
   a light source;
   a reflecting means for reflecting light emitted by the light source in a determined direction; and
   a compensating means for receiving the light reflected from the reflecting means and allowing the light to be output in the form of parallel rays,
   wherein the compensating means is a tapered fiber to which the light is directed, one end face of the tapered fiber nearer to the light source being smaller than the other end face thereof.

7. A projection type image display system according to claim 6, wherein the reflecting means is a reflecting mirror, the reflecting mirror having a shape of a body of rotation and having an optical axis as a rotation axis.

8. A projection type image display system according to claim 6, wherein the display element is a liquid crystal display element which comprises an optical element selected from a group consisting of a microlens array and a color filter.

9. A projection type image display system comprising a lighting device and a display element for forming an image by receiving light from the lighting device, the lighting device comprising:
   a light source;
   a reflecting means for reflecting light emitted by the light source in a determined direction; and
   a compensating means for receiving the light reflected from the reflecting means and allowing the light to be output in the form of parallel rays,
   wherein the compensating means is a compensating lens, the compensating lens having a shape of a lens face in which an angle between the normal of the lens face and a line parallel to the optical axis of the compensating lens is nearly zero at each point in the peripheral portion of the lens face of the compensating lens, and the angle becomes larger toward the center thereof.

10. A projection type image display system according to claim 9, wherein the compensating lens is a Fresnel lens.

11. A projection type image display system according to claim 9, wherein the reflecting means is a reflecting mirror, the reflecting mirror having a shape of a body of rotation and having an optical axis as a rotation axis.

12. A projection type image display system according to claim 9, wherein the display element is a liquid crystal display element which comprises an optical element selected from a group consisting of a microlens array and a color filter.

13. A projection type image display system comprising a lighting device and a display element for forming an image by receiving light from the lighting device, wherein the lighting device comprises:
   a light source;
   a reflecting means for reflecting light emitted by the light source in a determined direction; and
   a compensating means for receiving the light reflected from the reflecting means and providing an output light in the form of parallel rays,
   wherein the compensating means is a parallel ray selecting means for selectively allowing parallel rays to be output therefrom, the selecting means comprising:
      a plurality of optical paths, each of the optical paths being in parallel with each other; and
      a light absorbing means for absorbing unparallel rays so as to remove unparallel rays from the output light, the light absorbing means formed around each of the optical paths,
   wherein the projection type image display system further comprises a compensating lens disposed between the parallel ray selecting means and the light source, the compensating lens having a shape of a lens face in which at each point on the lens face, an angle $\theta_s$ between the normal of the lens face and a line parallel to the optical axis of the compensating lens is determined so as to satisfy the following equation:

$$\theta_s = \tan^{-1} \frac{\sin\alpha}{(n_4/n_3) - \cos\alpha}$$

where $\alpha$ represents an angle between an incident light and the optical axis, $n_3$ represents the refractive index of an external medium around the lens face, and $n_4$ represents the refractive index of the compensating lens, thereby the compensating lens having no focal point.

* * * * *

UNITED STATES PATENT AND TRADEMARK OFFICE
CERTIFICATE OF CORRECTION

PATENT NO. : 5,459,592  
DATED : October 17, 1995  
INVENTOR(S) : Shibatani et al Page 1 of 4

It is certified that error appears in the above-indentified patent and that said Letters Patent is hereby corrected as shown below:

The title page, should be deleted to be replaced with the attached title page:

Signed and Sealed this

Fifth Day of March, 1996

Attest:

Attesting Officer

BRUCE LEHMAN

Commissioner of Patents and Trademarks

United States Patent [19]

Shibatani et al.

[11] Patent Number: 5,459,592
[45] Date of Patent: Oct. 17, 1995

[54] PROJECTION DISPLAY SYSTEM INCLUDING A COLLIMATING TAPERED WAVEGUIDE OR LENS WITH THE NORMAL TO OPTICAL AXIS ANGLE INCREASING TOWARD THE LENS CENTER

[75] Inventors: Takashi Shibatani, Tenri; Tokihiko Shinomiya, Nara; Takuji Yamatani, Tenri; Hiroshi Hamada, Nara; Hiroshi Nakanishi, Tenri, all of Japan

[73] Assignee: Sharp Kabushiki Kaisha, Osaka, Japan

[21] Appl. No.: 50,909

[22] Filed: Apr. 21, 1993

[30] Foreign Application Priority Data

| Apr. 24, 1992 | [JP] | Japan | 4-106793 |
| Jun. 15, 1992 | [JP] | Japan | 4-155415 |
| Jun. 22, 1992 | [JP] | Japan | 4-163026 |

[51] Int. Cl.⁶ ................................. G02F 1/1335
[52] U.S. Cl. ............................ 359/40; 359/42; 359/49
[58] Field of Search .................... 359/40, 41, 42, 359/49

[56] References Cited

U.S. PATENT DOCUMENTS

| Re. 28,891 | 7/1976 | Borel et al. | 359/59 |
| 4,422,731 | 12/1983 | Droguet et al. | 359/80 |
| 4,432,610 | 2/1984 | Kobayashi et al. | 359/59 |
| 4,735,495 | 4/1988 | Henkes | 359/42 |
| 4,790,632 | 12/1988 | Miyakawa et al. | 359/40 |
| 4,824,216 | 4/1989 | Perbet et al. | 359/40 |
| 4,936,657 | 6/1990 | Tejima et al. | 359/40 |
| 4,950,059 | 8/1990 | Roberts | 359/48 |
| 5,056,895 | 10/1991 | Kahn | 359/71 |
| 5,083,854 | 1/1992 | Zampolin et al. | 359/40 |
| 5,150,238 | 9/1992 | Nakanishi et al. | 359/49 |
| 5,189,500 | 2/1993 | Kusunoki | 359/48 |
| 5,206,749 | 4/1993 | Zavracky et al. | 359/59 |
| 5,251,049 | 10/1993 | Sato et al. | 359/59 |

FOREIGN PATENT DOCUMENTS

| 3123369 | 2/1983 | European Pat. Off. | |
| 2553552 | 4/1985 | European Pat. Off. | |
| 0228288 | 7/1987 | European Pat. Off. | |
| 0295913 | 12/1988 | European Pat. Off. | 359/40 |
| 0339991 | 11/1989 | European Pat. Off. | |
| 0425251 | 5/1991 | European Pat. Off. | 359/40 |
| 57-74713 | 5/1982 | Japan | |
| 58-86613 | 6/1983 | Japan | |
| 60-165624 | 8/1985 | Japan | |

(List continued on next page.)

OTHER PUBLICATIONS

Oikawa et al, "Distributed-index planar microlens array prepared from deep electromigration", Electronics Letters, vol. 17, No. 13 (Jun. 1981), pp. 452–454.

E. L. Kerr, "Compact Sunshade For Telescope Antenna", Applied Optics, vol. 29, No. 24, p. 3458 (Aug. 29, 1990).

Patent Abstracts of Japan, vol. 13, No. 127 (p.-848), Mar. 1989.

Patent Abstracts of Japan, vol. 6, No. 156 (P.-135), Aug. 1982).

Patent Abstracts of Japan, vol. 12, No. 366 (p.-765), Sep. 1988.

Primary Examiner—Anita Pellman Gross
Attorney, Agent, or Firm—David G. Conlin; Kevin J. Fournier

[57] ABSTRACT

The present invention provides a lighting device including a light source; a reflecting mirror for reflecting light emitted by the light source in a determined direction; and a compensating element for receiving the light from the reflecting mirror and allowing the light to outgo in the form of parallel rays. Further, a projection type image display system including the above-mentioned lighting device and a display element for forming an image by receiving light from the lighting device is provided. According to the present invention, light can be emitted with a satisfactory degree of parallelization and an even illuminance, constant irregularity due to the photoelasticity can be degraded, and the degradation in brightness of a projected image due to a low ratio of aperture can be avoided. Thus, a uniform image with no illuminance irregularity can be projected.

13 Claims, 13 Drawing Sheets

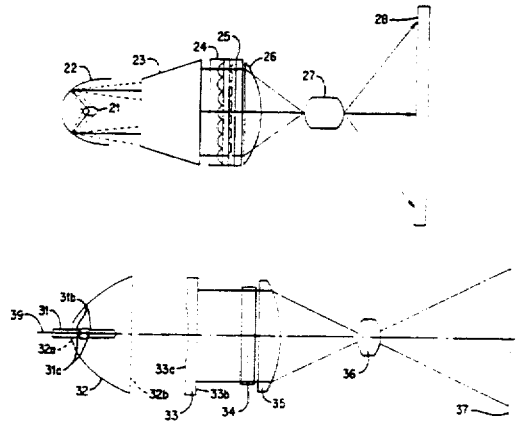

UNITED STATES PATENT AND TRADEMARK OFFICE
CERTIFICATE OF CORRECTION

PATENT NO. : 5,459,592

DATED : October 17, 1995

INVENTOR(S) : Shibatani et al

It is certified that error appears in the above-indentified patent and that said Letters Patent is hereby corrected as shown below:

In the drawings, sheet 6 of 13, please delete Fig.9 and replace with the corrected Fig. 9 as shown below:

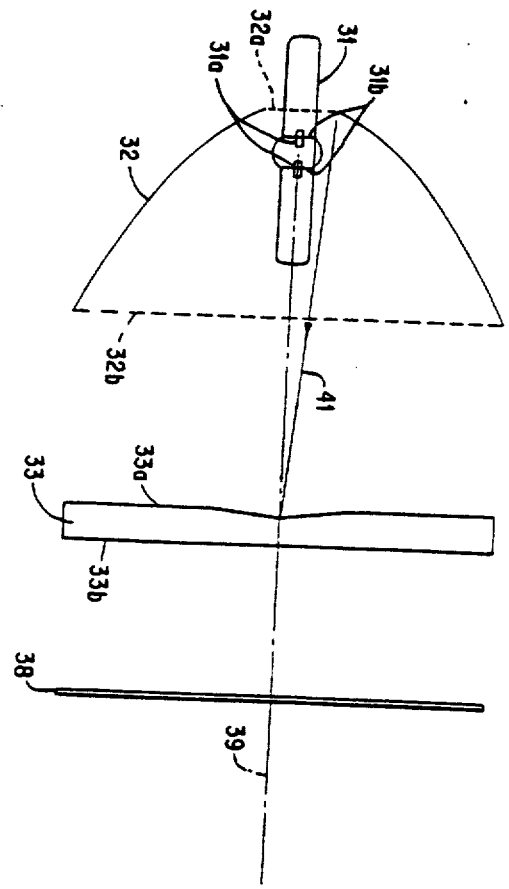

UNITED STATES PATENT AND TRADEMARK OFFICE
CERTIFICATE OF CORRECTION

PATENT NO. : 5,459,592
DATED : October 17, 1995
INVENTOR(S) : Shibatani et al

It is certified that error appears in the above-indentified patent and that said Letters Patent is hereby corrected as shown below:

In the drawings, please delete sheet 8 of 13, Fig. 12 and replace with corrected Fig. 12 as shown below:

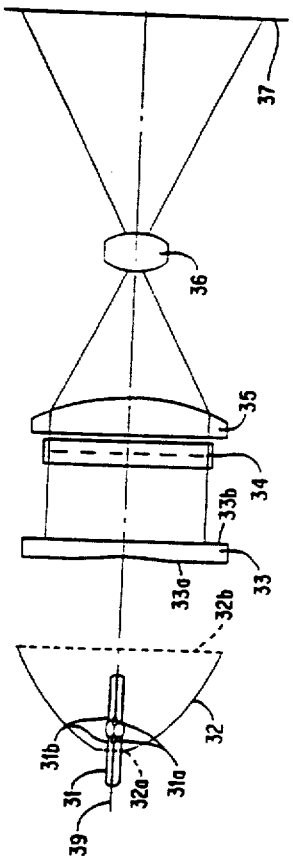

FIG. 12